Feb. 27, 1945.   G. H. LIEBEGOTT ET AL   2,370,551
RACK STRUCTURE FOR FREIGHT VEHICLES
Filed Aug. 7, 1943   4 Sheets-Sheet 1
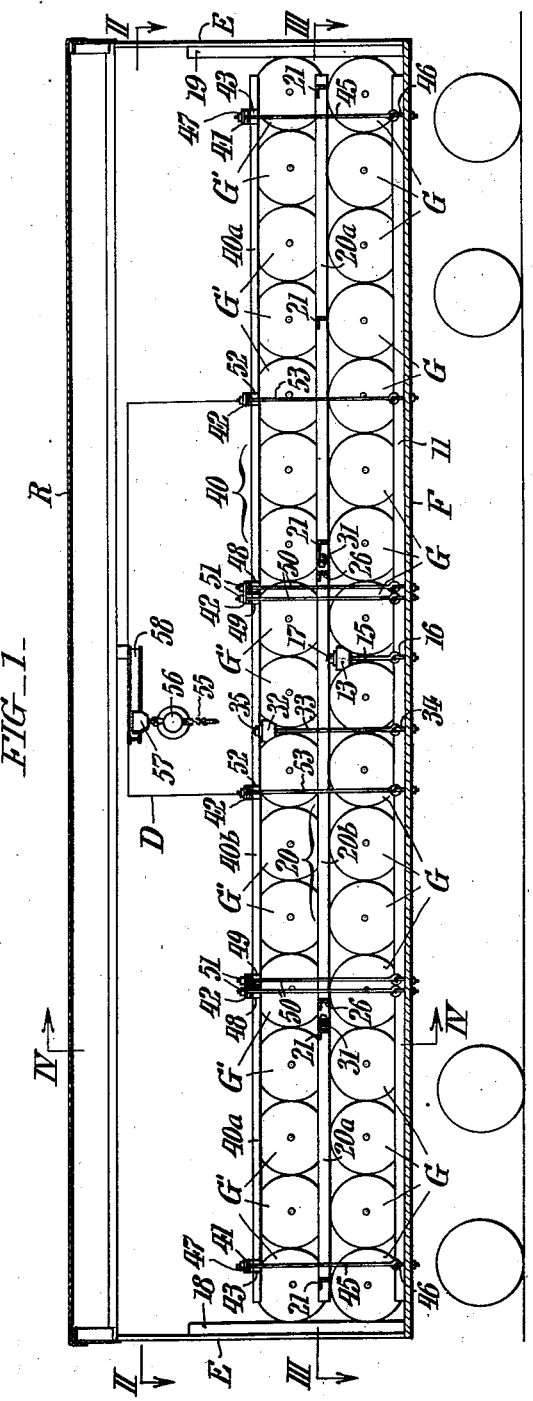
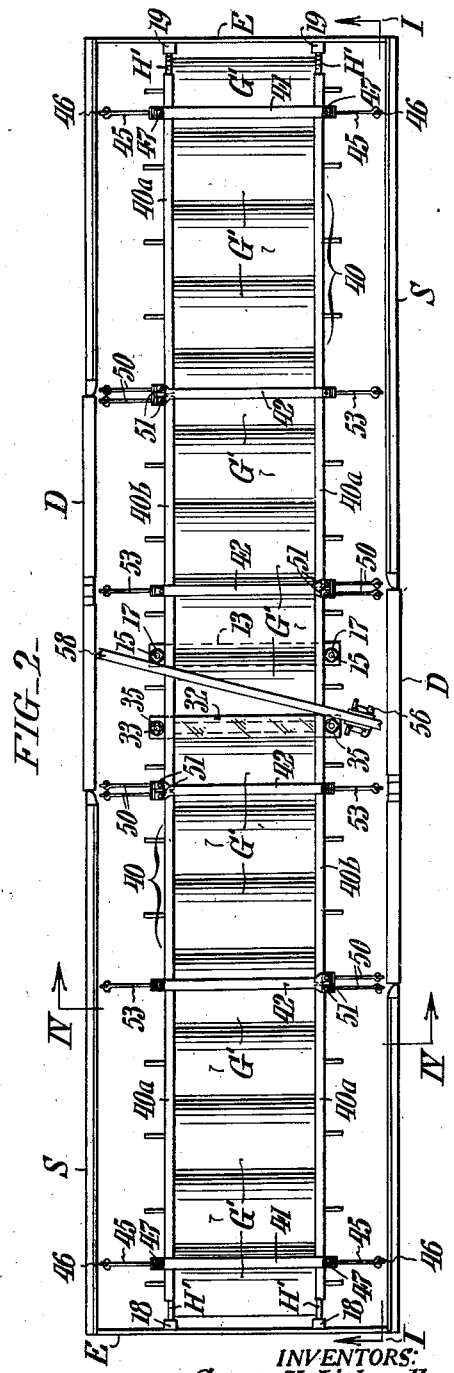
INVENTORS:
George H. Liebegott &
Max Seel,
BY Paul + Paul
ATTORNEYS.

Feb. 27, 1945. G. H. LIEBEGOTT ET AL 2,370,551
RACK STRUCTURE FOR FREIGHT VEHICLES
Filed Aug. 7, 1943 4 Sheets-Sheet 2
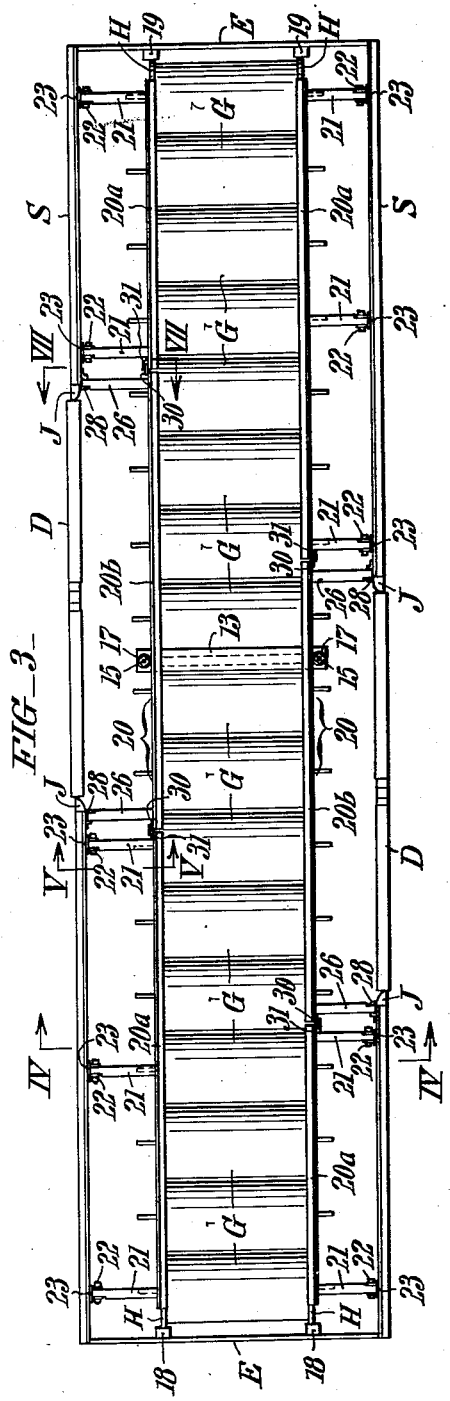
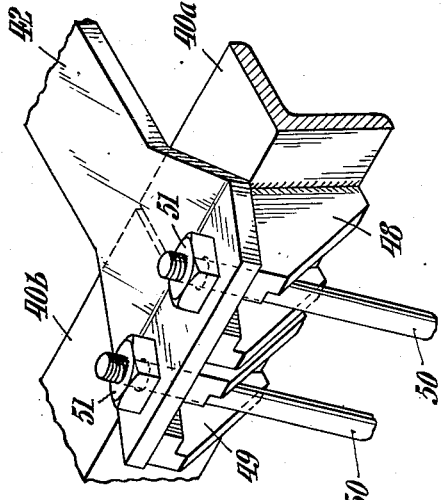
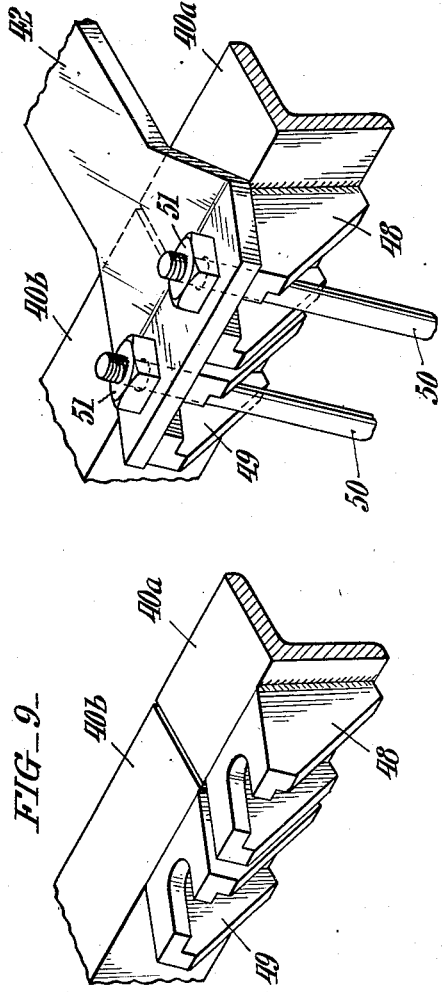
INVENTORS:
George H. Liebegott &
Max Seel,
BY
ATTORNEYS.

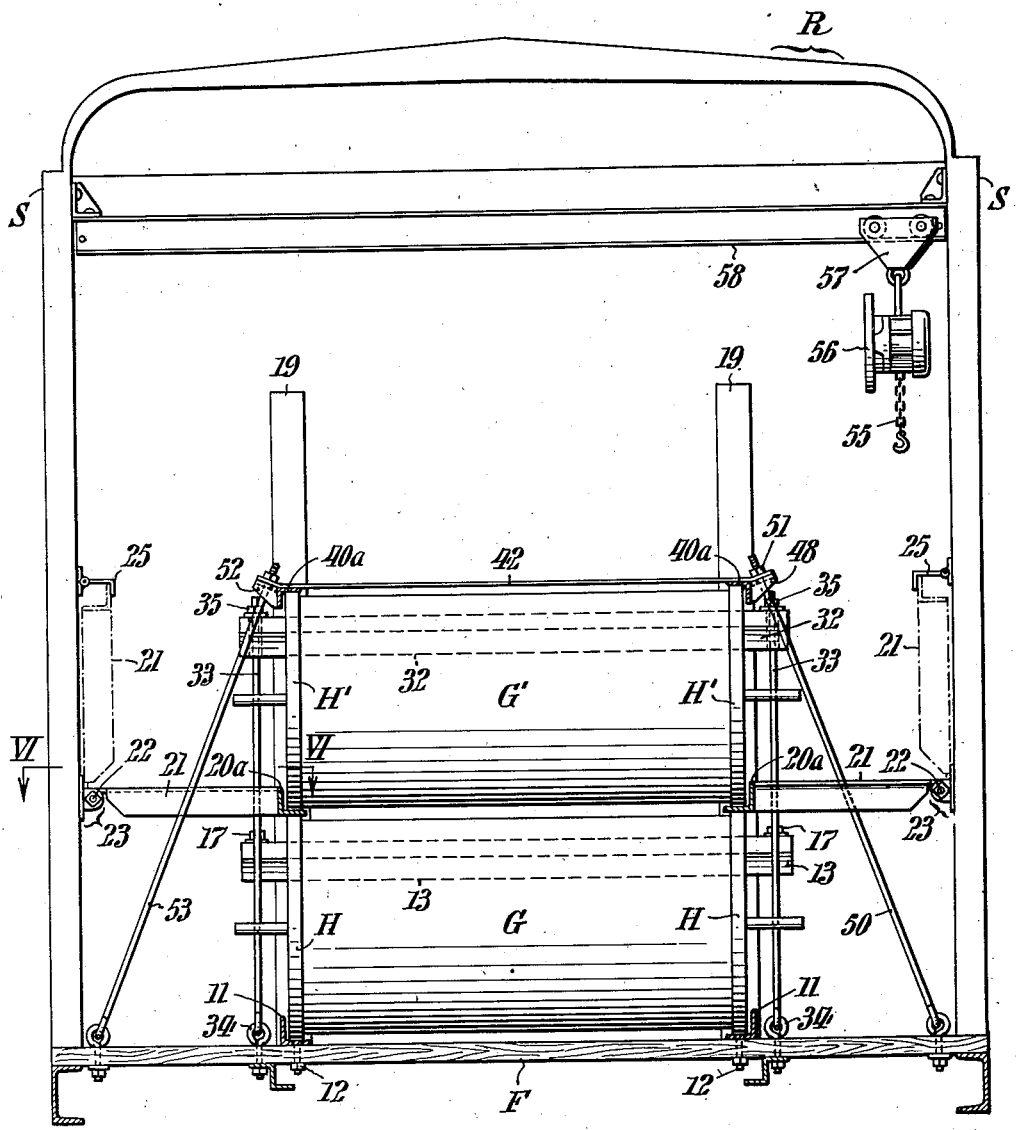

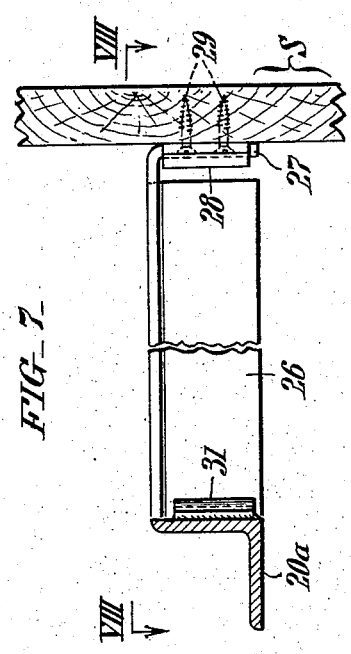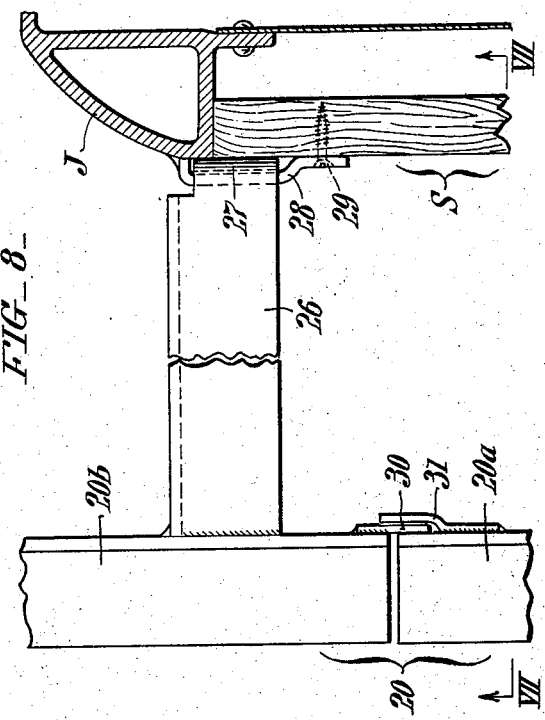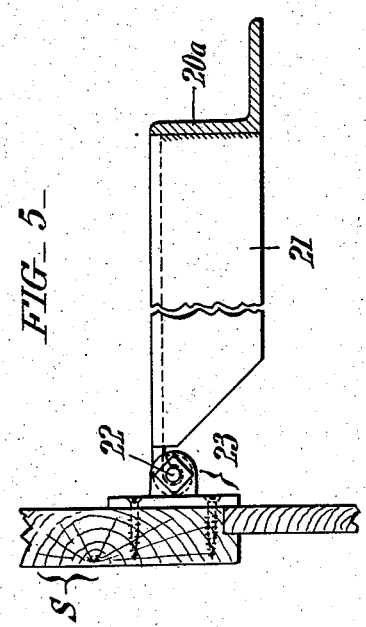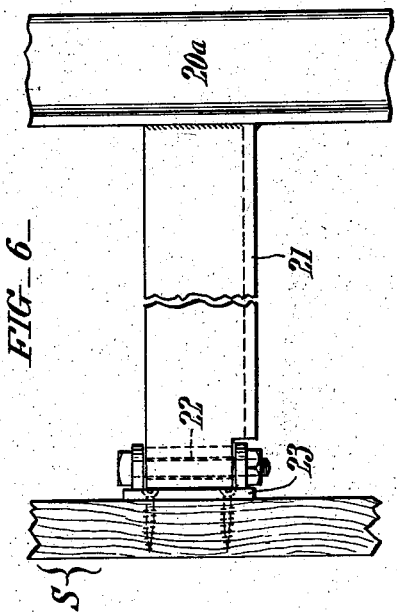

Patented Feb. 27, 1945

2,370,551

UNITED STATES PATENT OFFICE 2,370,551

RACK STRUCTURE FOR FREIGHT VEHICLES

George H. Liebegott, Philadelphia, and Max Seel, Lansdowne, Pa., assignors to The Pennsylvania Railroad Company, Philadelphia, Pa., a corporation of Pennsylvania Application August 7, 1943, Serial No. 497,722

13 Claims. (Cl. 105—367)

This invention relates to rack structures for freight vehicles, and has reference more particularly to rack structures useful in lading large heavy spool-like objects such as thread beams or reels of textile looms, wire or cable reels, car wheel sets, etc.

In the main, our invention is directed toward the provision of a rack structure suitable for the above mentioned purpose which is of simple and inexpensive construction; which is sturdy although light in weight; which will allow stacking of the spools in superposed rows; which is composed of parts capable of easy manipulation and arrangement incident to loading and unloading, and of being removed and/or retracted out of the way so that the full lading space of the vehicle may be available for other kinds of freight when desired or required, and which can be relied upon to prevent rolling as well as accidental endwise or up and down displacement of the spools incident to transit.

Other objects and attendant advantages will appear from the following detailed description of the attached drawings, wherein Fig. 1 is a broken-out more or less diagrammatic view in longitudinal section of a railway freight car taken as indicated by the angled arrows I—I in Fig. 2, conveniently embodying the rack structure of our invention.

Figs. 2 and 3 show, likewise more or less diagrammatically, horizontal sections of the car taken as indicated respectively by the angled arrows II—II and III—III in Fig. 1.

Fig. 4 is a transverse section of the car taken as indicated by the angled arrows IV—IV in Figs. 1, 2 and 3.

Figs. 5 and 6 are fragmentary views in transverse and horizontal section respectively taken as indicated by the angled arrows V—V and VI—VI in Figs. 3 and 4 and drawn to a larger scale.

Fig. 7 is a broken-out fragmentary cross sectional view taken as indicated by the angled arrows VII—VII in Figs. 3 and 8 and likewise drawn to a larger scale.

Fig. 8 is a broken out fragmentary perspective view taken as indicated by the angled arrows VIII—VIII in Fig. 7.

Figs. 9 and 10 are fragmentary perspective views of certain parts which will be referred to in detail hereinafter.

The railway freight car chosen by way of example herein is generally of conventional design with a body of the box type having solid side walls S, solid end walls E, a roof R and a floor F. Contrary to usual practice, however, the access door openings D in the opposite side walls of the car are off center and in diagonal alignment crosswise of the car as will be noted from Figs. 2 and 3.

The rack means with which the present invention is more especially concerned includes a pair of longitudinally-extending angle section rails 11, which form a longitudinal track centrally of the car body and which are permanently secured to the car floor F by suitably spaced screw bolts 12. As shown in Fig. 4, the rails 11 are positioned with their base flanges facing inwardly and spaced to suit the heavy spools G which are to be transported, with the upstanding flanges of said rails lapping the outer sides of the flange heads H of said spools. In lading, after the track has been completely filled with the spools G, a transversely arranged spreader bar 13 of triangular cross section is wedged from above between the flange heads of a pair of adjacent spools at an intermediate point in the row. As shown in Figs. 1, 3 and 4, the spreader bar 13 projects beyond the spools G and is apertured adjacent its ends for penetration by draw rods 15 whereof the lower ends are articulately connected to eye bolts 16 fixed in the floor F of the car, and to the protruding threaded top ends of which clamp nuts 17 are applied. By the wedging action of the bar 13 as the nuts 17 are drawn tight, the spools G to opposite sides thereof will be forced outward in opposite directions with their head flanges H in mutual contact, until the endmost ones bear firmly against upright stops 18 and 19 of timber or the like affixed respectively to the end walls E of the car body. The spools G are thus not only restrained against lateral shifting in the car but against rolling as well.

Adapted to be rested on the tops of the flange heads H of the spools G are additional track rails 20 for a superposed row of spools G'. Like the track rails 11, the rails 20 are of angle section and arranged in a similar manner with their horizontal flanges extending inwardly and their upright flanges lapping the outside faces of the flange heads H' of the spools G'. As illustrated in Fig. 3 each of the rails 20 is made up of three aligned components, i. e., two end components 20a, and an intermediate component 20b which is disposed at the region of the corresponding side doorway D of the car. Secured to the components 20a of each upper track rail 20 adjacent its ends are supporting arms 21 which are individually pivoted as at 22 to fixed hinge brackets 23 on the side walls S of the car body, so that said components can be swung upward out of the way against said walls as indicated in dot-and-dash lines in Fig. 4 to enable initial placement and subsequent removal of the lower row of spools G. Latch hooks such as shown at 25 in Fig. 4 serve to releasably hold the upper rail components 20a in raised or retracted position. The intermediate components 20b of the upper track rails 20 are likewise provided with supporting arms 26, but these have their ends turned downwardly as at 27 to releasably engage holder straps 28, which, see Figs. 7 and 8, are welded fast to the jambs J of the doorways D and which are additionally secured to the side walls S of the car by screws 29. The intermediate components 20b of the upper track rails 20 can thus be easily and quickly placed and removed to facilitate loading and unloading of the car. Welded or otherwise secured to the side flange of each of the intermediate components 20b of the upper track rails 20 at opposite ends thereof as instanced in Figs. 7 and 8, are tongues 30 which overlap offset tongues 31 similarly secured to the contiguous ends of the complemental components 20a. By this means, the several components 20a and 20b of each of the upper track rails 20 are locked in true alignment with each other when in lowered or active position.

A wedge bar 32 identical with the wedge bar 13 previously described is provided for the upper row of spools G' to insure edge contact of the head flanges H' of adjacent spools, with the head flanges of endmost spools likewise abutting the stops 18 and 19, the draw rods 33 for said wedge bar 32 being similarly articulately connected to eyes 34 at the car floor F and provided at their upper protruding threaded ends with clamp nuts 35.

The rack structure of our invention further includes a lashing means which comprises a pair of angle section hold-down rails 40 which, like the upper track rails 20, are each formed by three aligning components whereof the end ones are designated 40a and the intermediate ones 40b. As shown in Fig. 4, the hold-down rails 40 are rested on the tops of the head flanges H of the spools G' of the upper row, but are reversely positioned in respect to said track rails 20, i. e., with their vertical flanges downwardly lapping the outsides of said flange heads. Overlaid upon the rails 40 respectively adjacent their ends and at suitably spaced intermediate points are crosswise tie bars 41 and 42 which are preferably fashioned from relatively thick plate metal with their ends bent up at a slight angle as shown in Figs. 4 and 10. From Figs. 2 and 4 it will be observed that the tie bars 41, have single apertures at their opposite ends for registry with notches in angular bracket pieces 43 welded fast to the side flanges of the end components 40a of the rails 40, and for penetration by draw rods 45 which extend upwardly and inwardly at complementary angles from eye bolts 46 in the car floor and which at their upper ends are threaded for engagement by clamp nuts 47. The tie bars 42, see Figs. 1, 2 and 10, are placed transversely of the hold-down rails 40 in line with the splits between the contiguous ends of the end and intermediate components 40a and 40b of said rails, where said components are provided with notched angle bracket pieces 48 and 49 (see Fig. 9) like the bracket pieces 43 above referred to. The corresponding ends of the bars 42 which overlap the splits between the hold-down rail components 40a and 40b of the one hold-down rail 40 are each provided with two apertures for registry respectively with the notches of the bracket pieces 48 and 49 and for penetration by draw rods 50 similar to the anchorage rods 45 with clamp nuts 51 at their upper ends. At their opposite ends the tie bars 42 are provided with single apertures to register with notched brackets 52 on the components 40a and 40b of the other hold-down rail 40 and are secured by draw rods 53, as shown in Figs. 1 and 2. Staggering of the splits as between the components of the respective hold-down rails 40 makes necessary the reverse positioning of the alternate tie bars 42, as shown in Fig. 2. Thus it will be apparent that the lashing means can be relied upon to prevent vertical displacement of both rows of the spools in the car during transit, as well as to assist in precluding endwise shifting of the upper row of the spools.

In order to facilitate handling of the heavy spools incident to loading and unloading the car, we have provided a hoist chain 55 whereof the tackle block 56 is suspended from a trolley 57 which is confined for travel along an overhead I beam 58 extending crosswise of the car immediately beneath the roof R at the region of the side door openings D. As shown in Fig. 2, the beam 58 is set crosswise between the door openings D well off the transverse center plane of the latter so that ample room is allowed for manipulation of the spools, particularly for the ones last inserted in the respective rows.

When the use is not required, its parts (other than the pivotally attached rails 20 which are swingable out of the way as already explained) can be laid along the sides of the car on the floor where they will take up very little room, so that substantially the whole of the lading space is made available for other kinds of freight.

Having thus described our invention, we claim:

1. A rack structure for lading large and heavy spools and the like in freight vehicles, comprising a pair of fixed guide rails for engagement by the end flange heads of a row of spools; a second pair of guide rails for a superposed row of spools adapted to be respectively supported solely upon the aligned head flanges of the spools of the first row; means connecting the guide rails of the second pair to the car body for assurance against shifting laterally when in active position and with capacity for being retracted to permit placement and subsequent removal of the spools of the first row; and detachable lashing means for holding the spools of the two rows to their respective track rails.

2. A rack structure according to claim 1, in which the guide rails of both tracks are in the form of angle irons with their side flanges upstanding and upwardly lapping the end flange heads of the spools of the respective rows.

3. A rack structure according to claim 1, in which the guide rails of both tracks extend longitudinally of the body of the vehicle; and in which the rails of the upper track are connected, with capacity for individual retraction, to the opposite side walls of the vehicle.

4. A rack structure according to claim 1, in which the track rails for both rows of spools extend longitudinally of the body of the vehicle; in which the supporting means for the rails of the upper track are pivotally connected by lateral arms to the opposite side walls of the vehicle with capacity for being swung upwardly out of the way against said walls; and in which releasable means are provided for holding the upper track rails in retracted position when their use is not desired.

5. A rack structure for lading large and heavy spools and the like in freight vehicles, comprising a pair of fixed guide rails for engagement by the end flange heads of the spools; a second pair of guide rails for a superposed row of spools adapted to be rested respectively on the aligned head flanges of the first row of spools; and a spreader means operative at an intermediate point in each of the two spool rows to bring the head flanges of the spools to opposite sides thereof into mutual peripheral contact with the head flanges of the endmost spools bearing against fixed stops to prevent the spools from rolling during transit.

6. A rack structure according to claim 5, in which each spreader means includes a wedge bar for engaging from above between the head flanges of a pair of adjacent spools with its ends projecting beyond said spools; lashing rods articulately connected to the floor of the vehicle with their upper ends protruding through apertures in the ends of the wedge bars; and clamp nuts threadedly engaging the protruding ends of said rods.

7. A rack structure for lading large and heavy spools and the like in freight vehicles, comprising a pair of fixed guide rails for engagement by the end flange heads of the spools; a second pair of guide rails for a superposed row of spools adapted to be respectively supported solely upon the aligned head flanges of the first row of spools; means securing the guide rails of the second pair to the car body to prevent them from shifting laterally; and hold-down means including a pair of rails for respectively engaging over the tops of the head flanges of the spools of the superposed row, and means for lashing the hold-down rails against lateral as well as up and down displacement to the vehicle body.

8. A rack structure according to claim 7, in which the rails of the hold-down means are of angular cross section with their side flanges downwardly lapping the outsides of the head flanges of the spools of the superposed rows; in which outwardly projecting apertured lugs are secured at corresponding intervals to the hold-down rails; in which the lashing means includes crosswise tie bars with their ends overlying corresponding brackets of the two rails and having apertures for registry with those of said brackets, rods articulately connected to the floor of the vehicle with their upper ends engaging through the aligned apertures in the respective brackets and the corresponding ends of the tie bars, and clamp nuts threadedly engaging the protruding ends of said rods.

9. The combination with a freight vehicle having doorways medially of the opposite sides of its body, of a rack structure in accordance with claim 1, wherein the track rails and the hold-down rails all extend longitudinally of the vehicle body; and wherein the rails of the upper track and the rails of the hold-down means are respectively formed by three aligned components of which the intermediate ones correspond in position with the doorways, are of a length equal substantially to the width of said doorways, and are separately removable to facilitate loading and unloading of the spools.

10. The combination with a freight vehicle having doorways medially of the opposite sides of its body, of a rack structure in accordance with claim 1, wherein the rails of the upper and lower tracks and of the hold-down means are respectively formed by three aligned components of which the intermediate ones correspond in position with the doorways and are of a length substantially equal to the width of said doorways; wherein the end components of the track rails for the upper row of spools have supporting arms pivotally connected to the opposite side walls of the vehicle body so as to be retractible out of the way to facilitate loading and unloading; and where for a like purpose the intermediate rail components of the upper track are removable and provided with lateral arms which hook into strap brackets attached to the side walls of the car adjacent the jambs of the doorways.

11. The combination with a freight vehicle having doorways medially of the opposite sides of its body, of a rack structure in accordance with claim 1, wherein the rails of the upper and lower tracks and of the hold down means are respectively formed by three aligned components of which the intermediate ones correspond in position with the doorways and are of a length substantially equal to the width of said doorways; wherein the end components of the track rails for the upper row of spools have supporting arms pivotally connected to the opposite side walls of the vehicle body so as to be retractible out of the way to facilitate loading and unloading; wherein for a like purpose the intermediate rail components of the upper track are removable and provided with lateral arms which hook into strap brackets secured to the side walls of the vehicle body adjacent the jambs of the doorways; and wherein the contiguous ends of the components of the upper track rails are provided at their sides with projections which overlap and thereby lock said components in aligned relation when in active position.

12. The combination with a freight vehicle having doorways in the opposite sides of its body disposed off center in said sides and in diagonal alignment crosswise of the body, of a rack structure in accordance with claim 1, wherein the rails of the lower and upper tracks and of the hold-down means extend lengthwise of the vehicle body, wherein the rails of the upper track and the rails of the hold-down means are respectively formed by three aligned components whereof the intermediate ones correspond in position with the doorways and are of a length substantially equal to the width of said doorways; and wherein said intermediate components are separately removable to facilitate loading and unloading of the spools.

13. The combination with a freight vehicle having doorways in the opposite sides of its body disposed off center in said sides and in diagonal alignment crosswise of the body, of a rack structure in accordance with claim 7, in which the rail of the hold-down means is formed by three components whereof the intermediate ones are arranged to correspond in position with the doorways and are of a length equal substantially to the width of said doorways; in which the components of one hold-down rail are provided at their contiguous ends with outwardly projecting apertured lugs; in which the end components of the other hold-down rail are provided intermediate their ends with single apertured lugs; wherein tie bars extend crosswise over the rails, one end of each such tie bar having two apertures to correspond with the apertures of the lugs at the contiguous ends of the components of one rail, and a single aperture in its opposite end to correspond with the single lug on the end component of the opposite rail; in which rods articulately connected to the floor of the vehicle have their upper ends engaging through the aligned apertures in their respective brackets and the corresponding ends of the tie bars; and in which clamp nuts threadedly engage the protruding ends of said rods.

GEORGE H. LIEBEGOTT.
MAX SEEL.